(No Model.) 2 Sheets—Sheet I.
S. S. WHEELER, C. G. CURTIS & F. B. CROCKER.
ELECTRIC MOTOR.
No. 271,175. Patented Jan. 23, 1883.
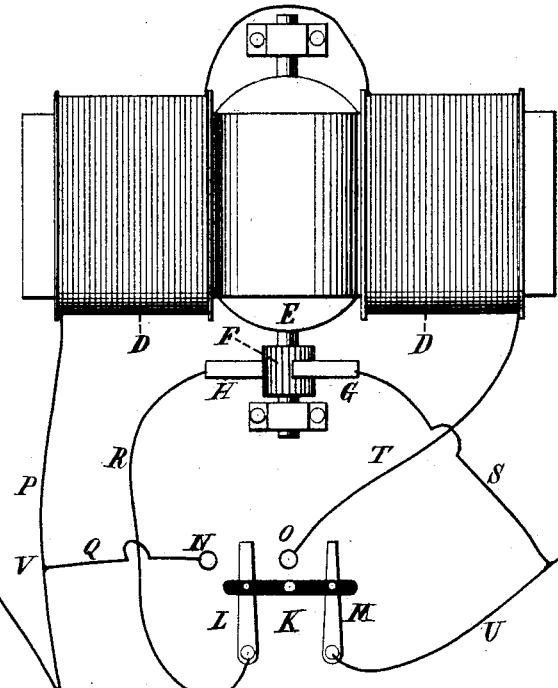
Fig. 1.
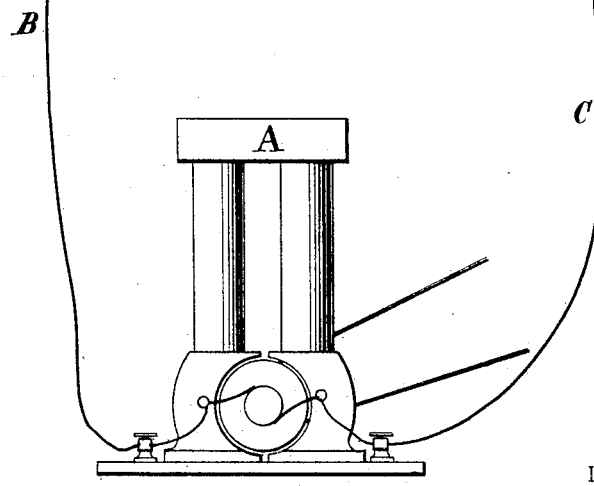
WITNESSES
INVENTORS.
Francis B. Crocker.
Schuyler S. Wheeler.
Chas. G. Curtis (No Model.) 2 Sheets—Sheet 2.
S. S. WHEELER, C. G. CURTIS & F. B. CROCKER.
ELECTRIC MOTOR.
No. 271,175. Patented Jan. 23, 1883.
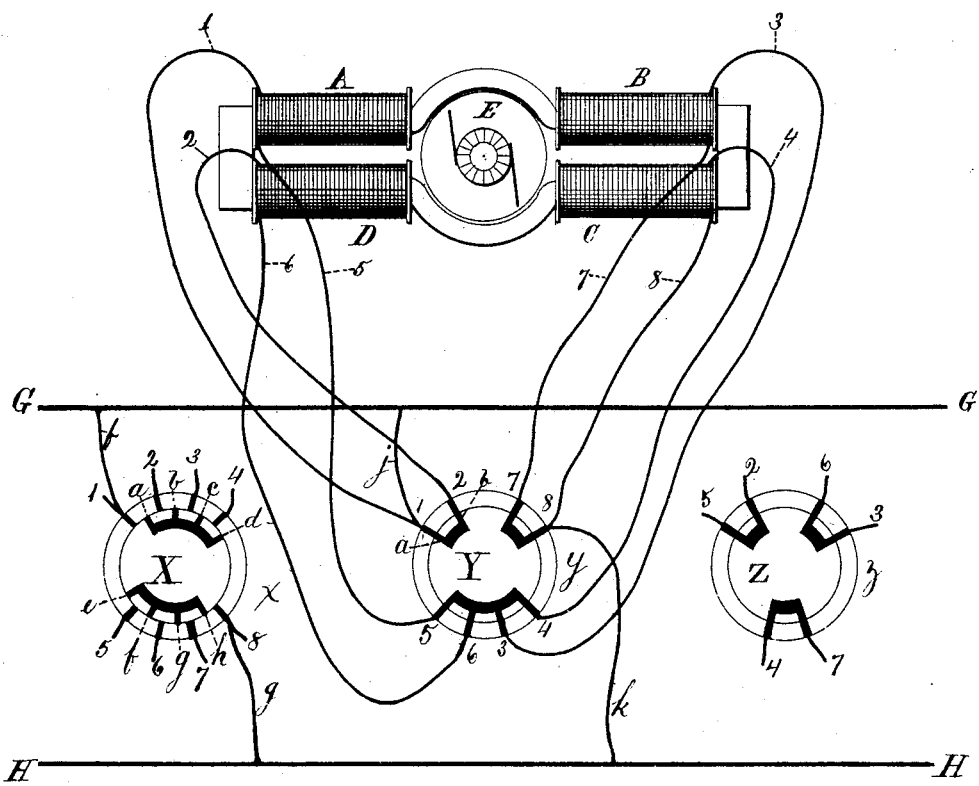

UNITED STATES PATENT OFFICE.

SCHUYLER S. WHEELER, CHARLES G. CURTIS, AND FRANCIS B. CROCKER, OF NEW YORK, N. Y.

ELECTRIC MOTOR.

SPECIFICATION forming part of Letters Patent No. 271,175, dated January 23, 1883.

Application filed September 25, 1882. (No model.)

*To all whom it may concern:*

Be it known that we, SCHUYLER S. WHEELER, CHARLES G. CURTIS, and FRANCIS B. CROCKER, citizens of the United States, residing in the city, county, and State of New York, have invented new and useful Improvements in Electric Motors, of which the following is a specification.

Our invention relates to electric motors which are actuated by electric currents supplied to them from unlimited sources of electrical energy—that is to say, from sources from which currents of greater or less strength may be derived, according to the amount of power which it is desired to have developed by the motor. It is well known that if the electro-motive force of such an electric current, or, more properly speaking, the electro-motive force of the electric generator, remain constant the strength of the current, or the amount of force in the form of electrical energy which flows through the motor, is determined by the electrical resistance of the circuit (including the resistance of the motor) in which the motor is placed, and may be increased or diminished at pleasure by altering the said resistance, and since the power developed by the motor depends upon the strength of current flowing through it advantage has heretofore been taken of this fact to regulate the power of the motors by cutting into or out of the circuit more or less auxiliary resistance. Such a method is objectionable and materially interferes with the efficiency of the apparatus, for the reason that whenever any resistance external to the motor is introduced into the circuit electrical energy is absorbed by it and transformed into heat without producing any useful electro-dynamic effect in the motor, and when this external or "dead" resistance, which is thus introduced for the purpose of increasing the resistance of the circuit, becomes anything like as great as the resistance of the motor itself, as it must become in order to reduce the power of the motor materially, it absorbs a very considerable portion of the total energy in the circuit, and to that extent impairs the efficiency of the system. Our invention is designed to secure the desired variation in the power or speed of the motor without entailing this loss of efficiency, not by varying the electrical resistance of the circuit external to the motor, but by altering the resistance of that part of the circuit which is comprised in the motor, and which produces the useful electro-dynamic effect therein, by which means the strength of current flowing through the motor may be regulated so as to secure the desired power or speed without the introduction into the circuit of any dead-resistance to uselessly absorb the current, the greater part of the resistance in circuit being, by our invention, confined to the electro-magnetic coils of the motor, in which the electrical is transformed into mechanical energy, and where, when the motor is working, it occasions comparatively no loss.

Our invention consists, first, in so arranging the connections of the armature and field-magnets of the motor, in combination with a peculiar switch, that they may be connected and the actuating-current made to flow through them, either in " series " or in " multiple arc," as desired, whereby the internal resistance of the motor is changed; and, second, when it is desirable to have the power capable of more than a single variation, in arranging the connections of the several coils or helices composing the field-magnets in combination with a peculiar switch, whereby the several coils may be connected in circuit, either in series, or in groups, or in multiple arc, by which means the internal resistance of the motor is rendered capable of two or more variations, as more particularly hereinafter set forth.

Our invention is especially designed to be applied to such electric motors as are supplied with actuating-currents by what is known as a "multiple" or "derived" circuit system of current-supplying conductors, throughout which a constant electro-motive force is maintained, and in which each motor, whenever operated, is placed in an independent branch or derived circuit, the resistance of which derived circuit determines the amount of current which is obtained through each motor. For example, the invention is particularly applicable to the motors of electric locomotives.

The method of varying the power or speed of an electric motor by varying its internal resistance is particularly set forth and claimed in another application for Letters Patent filed by us in the Patent Office on the 23d of March, 1882, and in this present application we intend to confine ourselves to the particular method herein described of changing the internal resistance of the motor.

In the accompanying drawings, Figure 1 is a plan view of an electric motor provided with a switch adapted to connect the armature and field-magnets either in series or in multiple arc, as desired, according to our invention. Fig. 2 represents an electric motor provided with switches arranged to connect the several coils or helices which constitute the field-magnets either in series, or in groups, or in multiple arc, as desired, according to our invention.

In Fig. 1, A represents the electrical generator or source of electrical energy, which may be a dynamo-electric machine or any other form of apparatus for generating electricity, and which is arranged in any well-known way to supply more or less electric current to the main conductors B and C, according to the demand.

D D are the field-magnet coils, E the armature, F the commutator, and G and H the commutator-brushes, of an electric motor of any well-known form of construction.

The switch K consists of two parallel swing switches or bars, L and M, connected together by a link of some insulating material, as shown, and of the stationary contact points or studs N and O, and the connections are arranged, as shown, so that when the switch is turned to the right and the bar L is in contact with the stud O the path of the current is as follows: from the main conductor B, through wire P, field-magnet coils D D, and wire T, to switch L; thence, by wire R and commutator-brushes H and G, through the armature E; thence, through wire S, back to the return-conductor C, the current in this case passing through the armature and field-magnets in series or in succession, and the resistance of the motor being equal to the sum of the resistances of the armature and field-magnets. When the switch is turned to the left the bar L makes connection to the stud N and the bar M makes connection to the stud O, and the path of the current is as follows: from conductor B to the point V, where the current splits, part passing by wire P, through field-coils D D, wire T, switch-bar M, and wire U, to return-conductor C, and part passing by wire Q, through switch-bar L, wire R, commutator-brushes G and H, through the armature E, and thence by wire S, to return-conductor C, the armature and field-magnets being thus connected in circuit in multiple arc, in which case the total resistance of the motor is equal to the product of the separate resistances of the armature and field-magnets divided by their sum. For example, if the resistance of the field-magnets were equal to that of the armature the total resistance of the motor, when connected in multiple arc, would be one-fourth as great, and consequently four times as much current would flow through it as if the armature and field-magnets were connected in series. It is to be observed that the switch K is so arranged that the actuating-current always passes through the armature and field-magnets in the same direction, whether they are connected in multiple arc or in series, so that the direction of rotation of the armature E is not reversed by the operation of the switch K.

Our second method of changing the internal resistance of the motor is shown in Fig. 2, in which A, B, C, and D represent the field-coils and E the armature, in side elevation, of the electric motor shown in plan in Fig. 1. We have here represented a motor having field-magnets composed of four separate coils or helices, and in such a case three arrangements of these coils in circuit are possible. First, the four coils may be connected in multiple arc, thus forming a quadruple conductor having the length of one coil; second, the four coils may be connected in two sets or groups of two each, the current passing first through one pair and then through the other, the result being that we have a double conductor with twice the length of one of the coils; and, third, the four coils may be connected in series, thus forming a single continuous conductor through the motor, whose length is equal to the sum of the four coils. It is essential in making the connections for these arrangements to have the current always pass through all the field-coils in the same direction as in the first-described method, and this result we secure by means of the three switches X, Y, and Z, which consist of revolving drums or disks X, Y, and Z, of some insulating material, upon which are set metallic strips $a$, $b$, $c$, $d$, $e$, $f$, &c., (shown in solid black,) designed to come in contact with and make the proper connections between the metallic switch-points 1 2 3 4 5 6 7, &c., set around the stationary disks $x$ $y$ $z$, which points are connected respectively to the eight terminals of the four field-coils A B C D, designated by the same figures, the wires connecting the terminals of the field-coils to the corresponding terminals of the field-coils being shown only in connection with switch Y, in order to avoid too great confusion of the drawings.

We have seen above that the four coils may be connected in three ways.

First. To connect them in multiple arc, which may be done by turning the disk X so as to bring the strips $a$ $b$ $c$ $d$, &c., into contact with and connect together the points 1, 2, 3, and 4, and also the points 5, 6, 7, and 8, in which case the path of the current is as follows: Entering from the current-supplying conductor G, through the wire $f$, to the point 1 of the switch X, it divides, one-quarter thereof flowing from the four points 1 2 3 4 through each of the four coils A B C D, and thence back to the four points 5 6 7 8, where the four currents reunite and flow to the return-conductor H through the wire $g$.

Second. The four coils may be connected in two sets of two each, and this is accomplished by turning the switch Y into the position shown in the drawings. The current will then flow from the main conductor G, through the wire $j$, to the points 1 and 2, where it will divide and traverse the two field-coils A and D in multiple arc, thence to the points 5 and 6 of the switch Y, thence from the points 3 and 4, through the field-coils B and C in multiple arc, and thence by the switch-points 7 and 8, to the return-conductor H through the wire $k$.

Third. The coils may be connected in series, and this is accomplished by turning the disk Z into the position shown, so as to connect the points 5 with 2, 6 with 3, and 7 with 4, in which case the current enters from the main conductor G, which is already in connection with the field-coil A by the wire $j$ of the switch Y, and flows through the coil A, thence to the switch-point 5 of the switch Z; thence through point 2 and coil D; thence to points 6 and 3 and through coil B; thence to points 7 and 4 and through coil C, the other end of which is already connected to the return-conductor H by the wire $k$ of switch Y, thus causing the current to traverse the four field-coils in succession.

Our invention is applicable to any form of electric motor, or of dynamo-electric machine; and it is clear that this last-described method may be employed where the field-magnets are composed of more than four separate coils or helices, and that various combinations of the coils in multiple arc, in groups, and in series connection may be made by means of switches similar to those herein shown.

If desired, the method of connecting the field-magnets and armature shown in Fig. 1 may be combined with the last-described method (shown in Fig. 2) by simply substituting the entire apparatus shown in Fig. 2 for the ordinary field-magnets of Fig. 1, by which means the internal resistance of the motor may be still further changed when required.

If desired, the three switches X Y Z may be superimposed upon one another, and fastened together so as to form one single drum, in order to enable the operator to move all three switches by the same handle; but we do not confine ourselves to any particular form of switch or switches for making the required connections.

What we claim as our invention, and desire to secure by Letters Patent, is—

1. The combination, with an electric motor consisting of an armature and field-magnets, substantially as described, of a circuit-controlling switch arranged to connect the circuit of the armature and the circuit of the field-magnets to the current-supplying conductors either in series or in multiple arc, substantially as and for the purpose set forth.

2. The combination, with the separate coils or helices A B C D, composing the field-magnets of an electric motor, of the circuit-controlling switches X, Y, and Z, substantially as described, by means of which the said coils may be instantly connected in circuit with the current-supplying conductors, either in series, or in groups, or in multiple arc, by a single movement of one of the said switches, substantially as and for the purpose set forth.

September 23, 1882.

SCHUYLER S. WHEELER.
    CHARLES G. CURTIS.
    FRANCIS B. CROCKER.

Witnesses:
    W. C. DEMOREST,
    DAVID WELCH.